(12) United States Patent
Van Meter, II

(10) Patent No.: US 10,373,039 B2
(45) Date of Patent: Aug. 6, 2019

(54) SYSTEM AND METHOD OF USING A LOW ENERGY PERSONAL AREA NETWORK RETAINED SIGNAL STRENGTH INDICATION FOR LOCATING UNDERGROUND UTILITY MONUMENTS

(71) Applicant: Stanley G. Van Meter, II, Lake Mary, FL (US)

(72) Inventor: Stanley G. Van Meter, II, Lake Mary, FL (US)

(73) Assignee: UNITED EFFICIENCY, INC., Mount Dora, FL (US)

( * ) Notice: Subject to any disclaimer, the term of this patent is extended or adjusted under 35 U.S.C. 154(b) by 0 days.

(21) Appl. No.: 15/981,221

(22) Filed: May 16, 2018

(65) Prior Publication Data
US 2018/0336448 A1 Nov. 22, 2018

Related U.S. Application Data

(60) Provisional application No. 62/507,022, filed on May 16, 2017.

(51) Int. Cl.
*G08B 1/08* (2006.01)
*G06K 19/07* (2006.01)
*G01S 19/42* (2010.01)
*H04W 4/80* (2018.01)
*H04W 4/029* (2018.01)

(52) U.S. Cl.
CPC .......... *G06K 19/0725* (2013.01); *G01S 19/42* (2013.01); *H04W 4/029* (2018.02); *H04W 4/80* (2018.02)

(58) Field of Classification Search
CPC ..... G06K 19/0725; G01S 19/42; H04W 4/80; H04W 4/029; G01V 15/00
USPC ................................ 340/539.1, 10.1, 572.1
See application file for complete search history.

(56) References Cited

U.S. PATENT DOCUMENTS

| 7,414,571 | B2 * | 8/2008 | Schantz | ................. G01V 15/00 340/539.22 |
| 8,264,226 | B1 * | 9/2012 | Olsson | ..................... G01V 3/15 324/329 |
| 9,696,447 | B1 * | 7/2017 | Olsson | ..................... G01S 7/03 |

* cited by examiner

*Primary Examiner* — Toan N Pham
(74) *Attorney, Agent, or Firm* — White-Welker & Welker, LLC; Matthew T. Welker, Esq.

(57) ABSTRACT

The utility tracker taught by the present invention is a BLUETOOTH low energy tag, plus a three axis accelerometer which is approximately the size of a quarter. The utility tracker of the present invention can be secured, typically by "sticking" the dot to an asset by releasable glue or tape. The utility tracker may be stuck to any asset, which could be a fiber optic cable, or any other non-metallic asset that get placed by a utility company, and which can subsequently be detected by a mobile device.

11 Claims, 20 Drawing Sheets

Marker Location Confirmed

Name: FO Residential 213

Utility Marker ID: X56Y

Utility Type: Fiber optic armored 900 micron buffered

Location: 4621 Cactus Lane, Mount Dora, FL. 32757

Notes: Front yard about six yards left of the driveway if your facing the house

Return home

Fig. 5

SYSTEM AND METHOD OF USING A LOW ENERGY PERSONAL AREA NETWORK RETAINED SIGNAL STRENGTH INDICATION FOR LOCATING UNDERGROUND UTILITY MONUMENTS

CROSS REFERENCE TO RELATED APPLICATIONS

This application claims priority from U.S. patent application Ser. 62/491,224, entitled "System and method of using a low energy personal area network retained signal strength indication for locating underground utility monuments", filed on May 16, 2017. The benefit under 35 USC § 119(e) of the United States provisional application is hereby claimed, and the aforementioned application is hereby incorporated herein by reference.

FEDERALLY SPONSORED RESEARCH

Not Applicable

SEQUENCE LISTING OR PROGRAM

Not Applicable

TECHNICAL FIELD OF THE INVENTION

The present invention relates in general to detecting a stationary beacon using mobile software applications. More specifically, the present invention relates to leveraging the Bluetooth Low Energy technology to act as a signal beacon that can be detected by a mobile device.

BACKGROUND OF THE INVENTION

The present invention relates generally to wireless detection of assets. More specifically, the present invention relates to a system and method for detecting a Bluetooth Low Energy beacon that has been buried at the termination point of a fiber optic cable.

SUMMARY OF THE INVENTION

The utility tracker taught by the present invention is a BLUETOOTH low energy tag, plus a three axis accelerometer which is approximately the size of a quarter. The utility tracker of the present invention can be secured, typically by "sticking" the dot to an asset by releasable glue or tape. The utility tracker may be stuck to any asset, which could be a fiber optic cable, or any other non-metallic asset that gets placed by a utility company, and which can subsequently be detected by a mobile device. The mobile device utilizes both GPS and radio signals to pinpoint the location of the utility tracker.

Definitions

An "accelerometer" is a device that measures proper acceleration ("g-force"). Proper acceleration is not the same as coordinate acceleration (rate of change of velocity).

"Application software" or "software" is a set of one or more programs designed to carry out operations for a specific application. Application software cannot run on itself but is dependent on system software to execute. Examples of application software include MS Word, MS Excel, a console game, a library management system, a spreadsheet system etc. The term is used to distinguish such software from another type of computer program referred to as system software, which manages and integrates a computer's capabilities but does not directly perform tasks that benefit the user. The system software serves the application, which in turn serves the user.

The term "app" is a shortening of the term "application software". It has become very popular and in 2010 was listed as "Word of the Year" by the American Dialect Society.

"Apps" are usually available through application distribution platforms, which began appearing in 2008 and are typically operated by the owner of the mobile operating system. Some apps are free, while others must be bought. Usually, they are downloaded from the platform to a target device, but sometimes they can be downloaded to laptops or desktop computers.

BLUETOOTH is a wireless technology standard for exchanging data over short distances (using short-wavelength UHF radio waves in the ISM band from 2.4 to 2.485 GHz) from fixed and mobile devices, and building personal area networks (PANs).

BLUETOOTH low energy (Bluetooth LE, BLE, marketed as BLUETOOTH SMART) is a wireless personal area network technology designed and marketed by the Bluetooth Special Interest Group aimed at novel applications in the healthcare, fitness, beacons, security, and home entertainment industries.

A compass is an instrument used for navigation and orientation that shows direction relative to the geographic cardinal directions, or "points". Usually, a diagram called a compass rose, shows the directions north, south, east, and west as abbreviated initials marked on the compass.

"Electronic Mobile Device" is defined as any computer, phone, or computing device that is comprised of a battery, display, circuit board, and processor that is capable of processing or executing software. Examples of electronic mobile devices are smartphones, laptop computers, and table PCs.

The Global Positioning System (GPS) is a space-based navigation system that provides location and time information in all weather conditions, anywhere on or near the Earth where there is an unobstructed line of sight to four or more GPS satellites.

"GUI". In computing, a graphical user interface (GUI) sometimes pronounced "gooey" (or "gee-you-eye")) is a type of interface that allows users to interact with electronic devices through graphical icons and visual indicators such as secondary notation, as opposed to text-based interfaces, typed command labels or text navigation. GUIs were introduced in reaction to the perceived steep learning curve of command-line interfaces (CLIs), which require commands to be typed on the keyboard.

A gyroscope is a spinning wheel or disc in which the axis of rotation is free to assume any orientation. When rotating, the orientation of this axis is unaffected by tilting or rotation of the mounting, according to the conservation of angular momentum. Because of this, gyroscopes are useful for measuring or maintaining orientation. Applications of gyroscopes include inertial navigation systems where magnetic compasses would not work (as in the Hubble telescope) or would not be precise enough (as in intercontinental ballistic missiles), or for the stabilization of flying vehicles like radio-controlled helicopters or unmanned aerial vehicles, and recreational boats and commercial ships.

A "mobile app" is a computer program designed to run on smartphones, tablet computers and other mobile devices, which the Applicant/Inventor refers to generically as "a computing device", which is not intended to be all inclusive of all computers and mobile devices that are capable of executing software applications.

In telecommunications, received signal strength indicator (RSSI) is a measurement of the power present in a received radio signal. RSSI is usually invisible to a user of a receiving device. However, because signal strength can vary greatly and affect functionality in wireless networking, IEEE 802.11 devices often make the measurement available to users. RSSI is often done in the intermediate frequency (IF) stage before the IF amplifier. In zero-IF systems, it is done in the baseband signal chain, before the baseband amplifier. RSSI output is often a DC analog level. It can also be sampled by an internal ADC and the resulting codes available directly or via peripheral or internal processor bus.

A "smartphone" (or smart phone) is a mobile phone with more advanced computing capability and connectivity than basic feature phones. Smartphones typically include the features of a phone with those of another popular consumer device, such as a personal digital assistant, a media player, a digital camera, and/or a GPS navigation unit. Later smartphones include all of those plus the features of a touchscreen computer, including web browsing, wideband network radio (e.g. LTE), Wi-Fi, 3rd-party apps, motion sensor and mobile payment.

A "trip" is defined as the movement of a person from a starting point to an end point or destination. A trip may or may not include multiple stops of various lengths of time.

A "User" is any person registered to use the computer system executing the method of the present invention.

A "web application" or "web app" is any application software that runs in a web browser and is created in a browser-supported programming language (such as the combination of JavaScript, HTML and CSS) and relies on a web browser to render the application.

"Wi-Fi", also spelled Wifi, WiFi, or wifi, is a local area wireless technology that allows an electronic device to exchange data or connect to the internet using 2.4 GHz UHF and 5 GHz SHF radio waves. The name is a trademark name, and is a play on the audiophile term Hi-Fi. The Wi-Fi Alliance defines Wi-Fi as any "wireless local area network (WLAN) products that are based on the Institute of Electrical and Electronics Engineers' (IEEE) 802.11 standards". [1] However, since most modern WLANs are based on these standards, the term "Wi-Fi" is used in general English as a synonym for "WLAN". Only Wi-Fi products that complete Wi-Fi Alliance interoperability certification testing successfully may use the "Wi-Fi CERTIFIED" trademark.

BRIEF DESCRIPTION OF THE DRAWINGS

The accompanying drawings, which are incorporated herein form a part of the specification, illustrate the present invention and, together with the description, further explain the principles of the invention and to enable a person skilled in the pertinent art to make and use the invention.

FIG. 5 is a simulated marker location confirmation screen shot of the display of the method of the present invention as shown on a mobile device.

DETAILED DESCRIPTION OF THE INVENTION

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figure, it is possible to see the various major elements constituting the apparatus of the present invention.

The utility tracker taught by the present invention is a BLUETOOTH low energy tag, plus a three axis accelerometer which is approximately the size of a quarter. The utility tracker of the present invention can be secured, typically by "sticking" the dot to an asset by releasable glue or tape.

The utility tracker may be stuck to any asset, which could be a fiber optic cable, or any other non-metallic asset that get placed by a utility company, and which can subsequently be detected by a mobile device. The mobile device utilizes both GPS and radio signals to pinpoint the location of the utility tracker.

In one embodiment, the utility tracker can be employed in an underground setting. In one example of this embodiment, the utility tracker can be attached to the termination point of a buried fiber optic cable, although one of ordinary skill in the art would realize that the utility tracker can be attached to any buried asset.

Upon attachment of the utility tracker to a buried cable, such as the termination point of a fiber optic cable, the utility tracker and its Bluetooth Low Energy beacon are used for tracking the asset's location with a mobile device. During placement of the utility tracker, the device ID, GPS coordinates, pictures, and notes would be stored for future users to use to locate the utility tracker.

Figure 20:
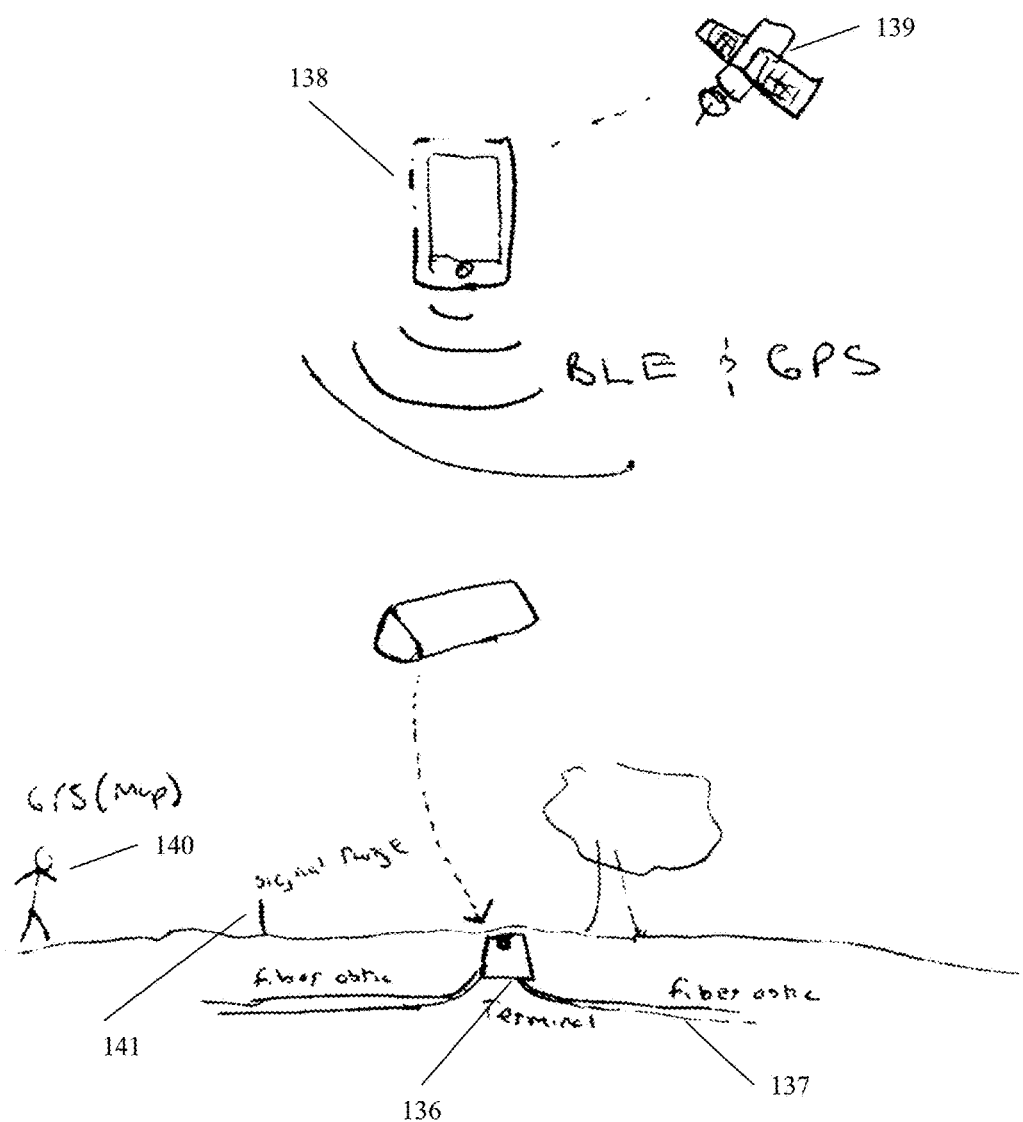
FIG. 20 is a sketch of the physical components, arrangement, and flow of data used to implement the present invention.

FIG. 20 is a sketch of the physical components, arrangement, and flow of data used to implement the present invention. A lower energy beacon 136 is attached to a buried fiber optic cable 137. A smartphone 138 uses satellite GPS data 139 and local signal strength from a lower energy beacon 136 to determine the location of the lower energy beacon 136. A user 140 walks near the location of the lower energy beacon 136 satellite GPS data 139 on their smartphone 138 to direct them to the general location. Once the user 140 is within signal range 141 of the lower energy beacon 136, the marker/beacon tracking software can be used to measure signal strength of the lower energy beacon 136 and guide the user to the exact location.

Utility workers would select an asset they wish to locate, and then be directed to a general area to begin the search for a fiber optic termination point by information stored when the utility tracker was first placed, such as GPS coordinates, pictures, drawings, notes, etc. The user would then utilize a mobile device and GPS to approach the radio signal of the utility tracker. Once in range of the beacon, the mobile device would detect a signal from the utility tracker.

At this point the signal direction is not easy to detect, so a unique calibration method has been developed which utilizes the user's body as a shield. While holding the mobile device close to the user's body, and selecting to calibrate on the mobile device, the user slowly turns 360 degrees. The mobile device is then able to detect direction, and the software would direct the user toward that signal.

As the user approaches the origin of the signal, the software would display a greater signal strength, and if the user should happen to go past the utility tracker, the signal strength would decrease.

Figure 1:
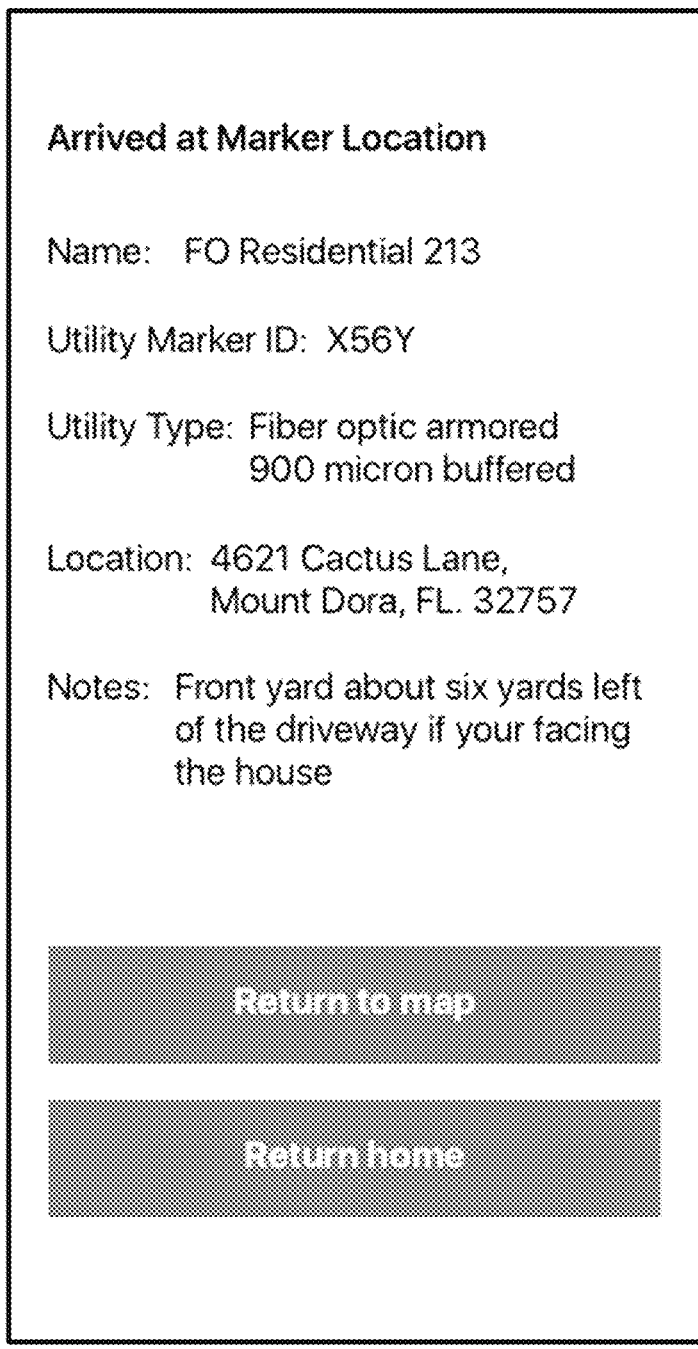
FIG. 1 is a simulated arrival screen shot of the display of the method of the present invention as shown on a mobile device.

Now referring to FIGS. 1-17, the embodiment of the case of a buried fiber optic cable is shown. FIG. 1 is a simulated arrival screen shot of the display 100 of the method of the present invention as shown on a mobile device.

Figure 2:
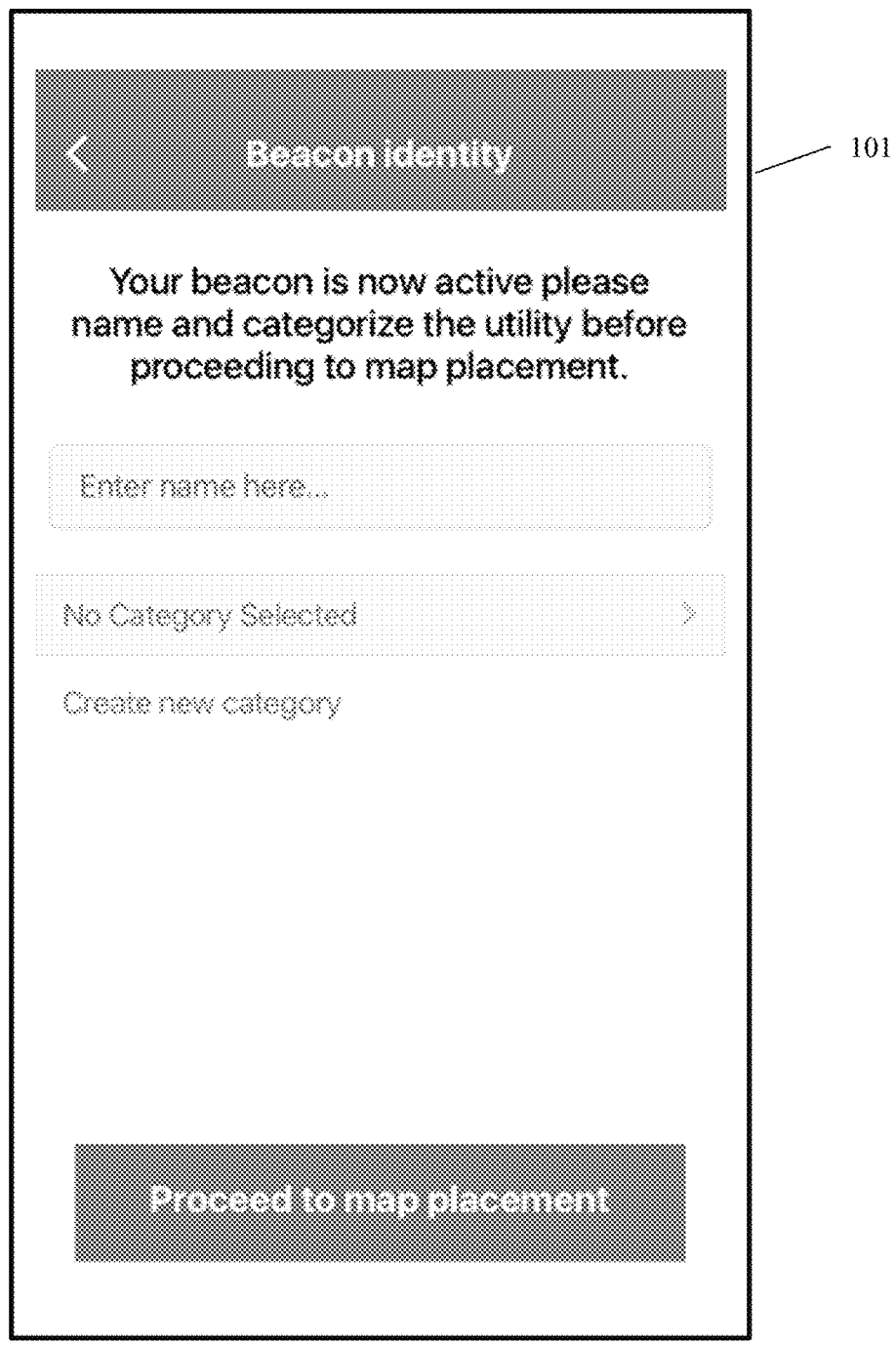
FIGS. 2-4 are simulated beacon identity screen shots of the display of the method of the present invention as shown on a mobile device.
Figure 3:
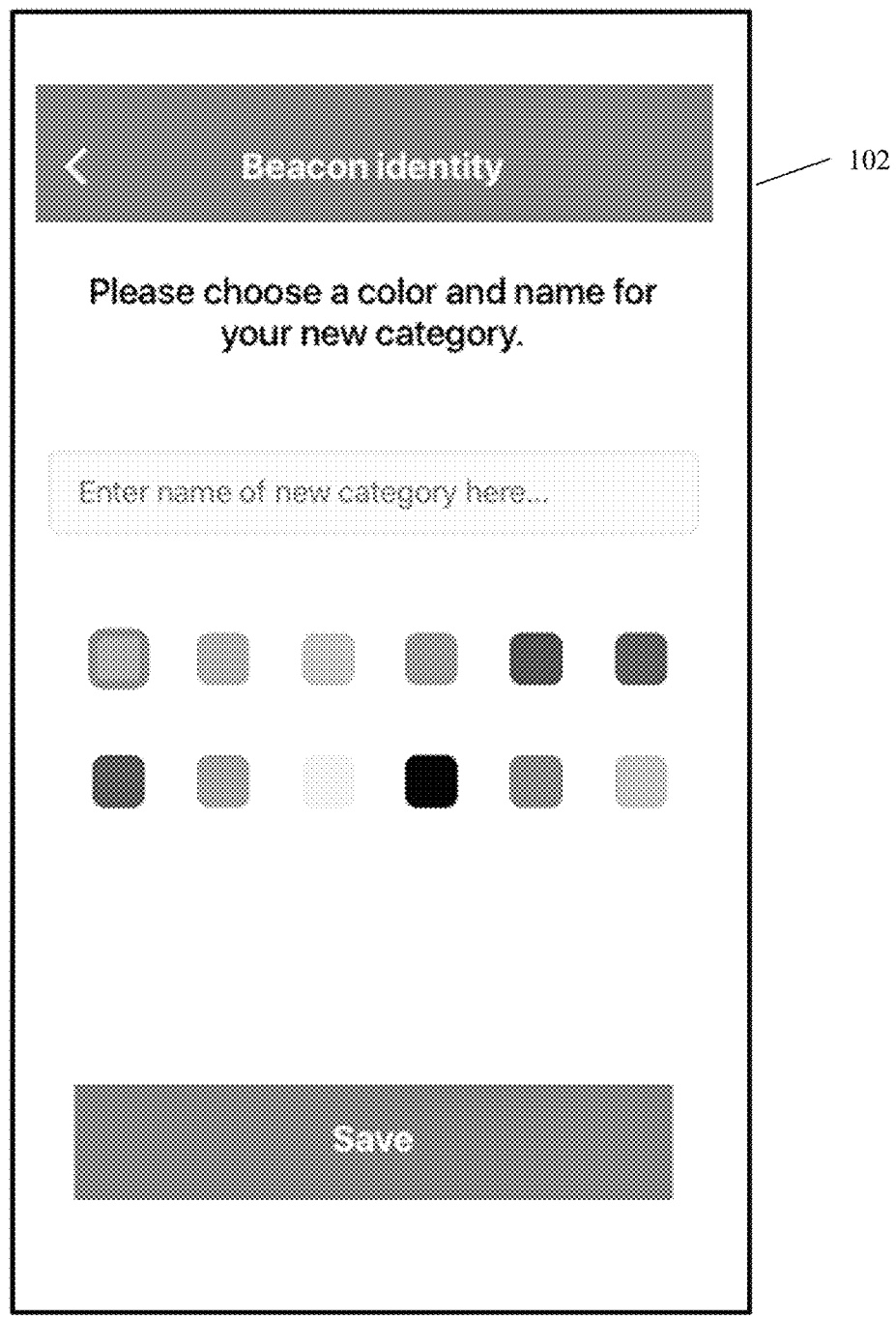
Figure 4:
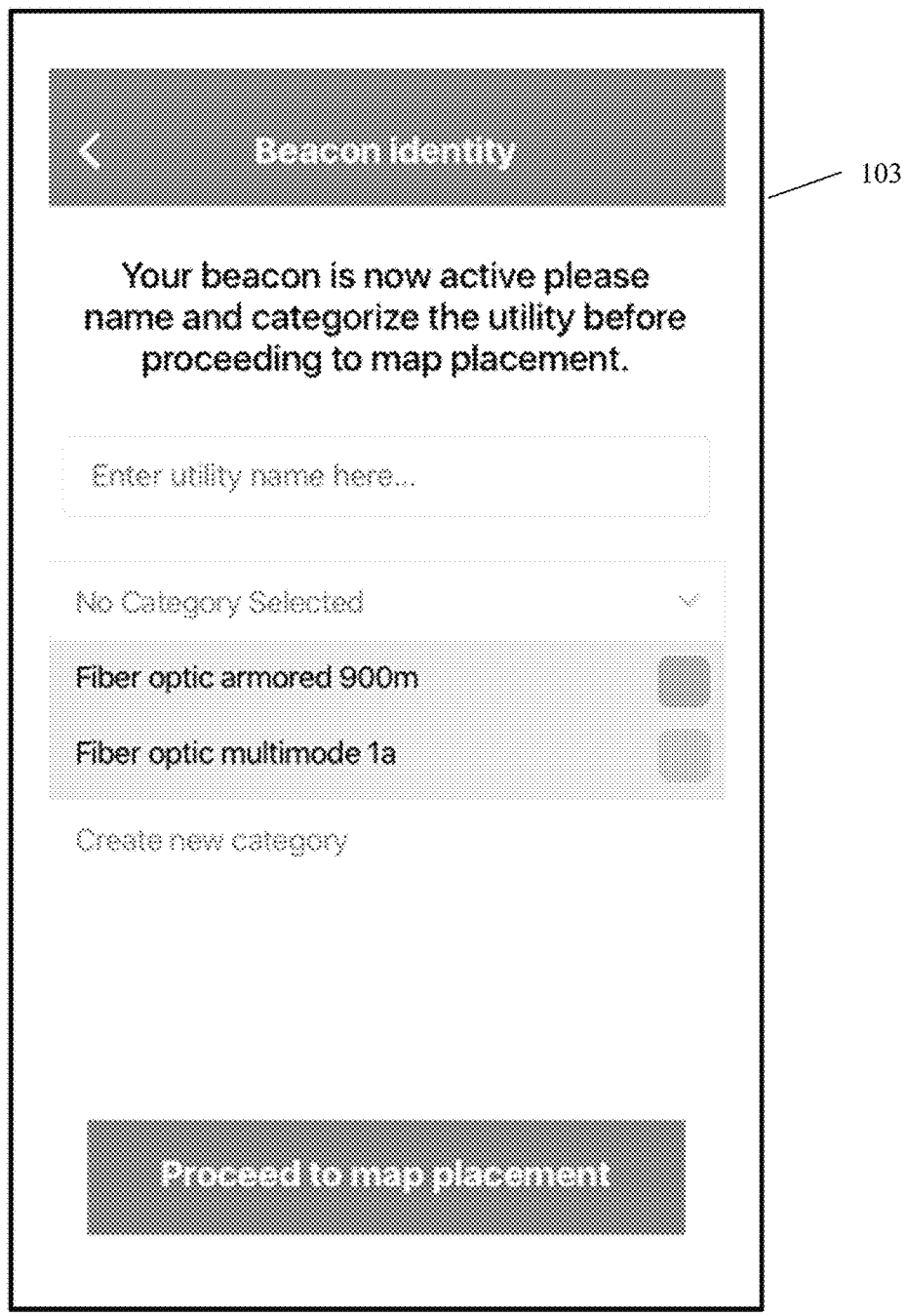

FIGS. 2-4 are simulated beacon identity screen shots of the display 100 of the method of the present invention as shown on a mobile device. On a beacon identity screen 101, once a beacon is active, the user can identify the newly activated beacon with a name and category before proceeding to map placement. On a subsequent screen 102 the user can choose a color and name for newly created categories not already in the system. Once a beacon is active, the beacon identity, including name and category, is set before proceeding to map placement 103. FIG. 5 is a simulated marker location confirmation screen shot 104 of the display of the method of the present invention as shown on a mobile device. In the screen the marker location is shown as being confirmed along with the marker/beacon's name, utility marker ID, utility type, location, and any notes with respect to its location and identifying its locations.

Figure 6:
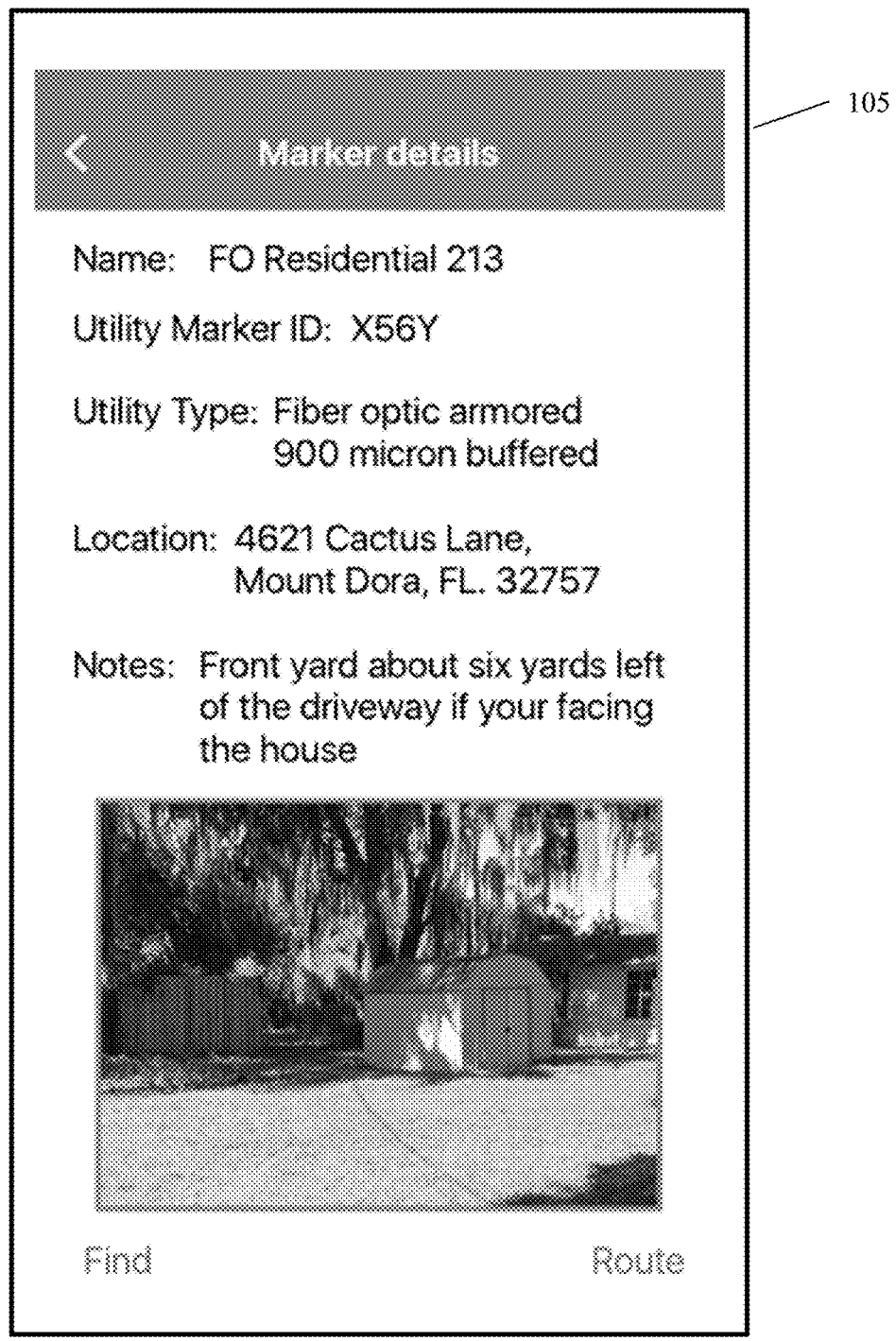
FIG. 6 is a simulated marker details screen shot of the display of the method of the present invention as shown on a mobile device.

FIG. 6 is a simulated marker details screen shot 105 of the display of the method of the present invention as shown on a mobile device. Here marker details shown include the name, utility marker ID, utility type, location, any notes with respect to its location and identifying its locations, and an image or picture of the location.

Figure 7:
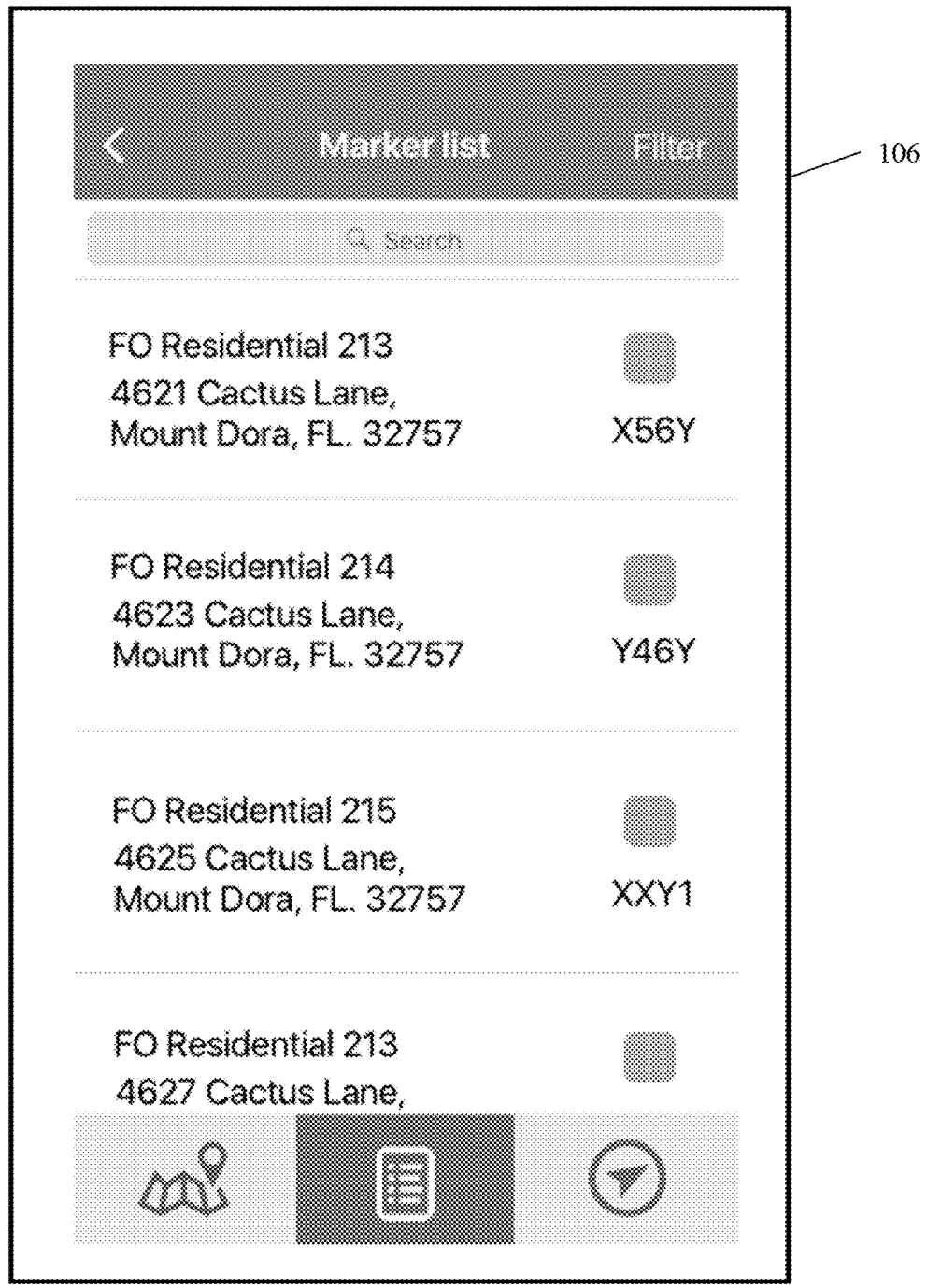
FIG. 7 is a simulated mark list screen shot of the display of the method of the present invention as shown on a mobile device.

FIG. 7 is a simulated mark list screen shot 106 of the display of the method of the present invention as shown on a mobile device. Here, a list of markers is presented on the display which can be shown in either a map view, list view, or by location/nearby. The marker details include the address, color code for type and ID.

Figure 8:
FIG. 8 is a simulated "mark a location" screen shot of the display of the method of the present invention as shown on a mobile device.

FIG. 8 is a simulated "mark a location" screen shot 107 of the display of the method of the present invention as shown on a mobile device. In this display, the marker location is overlaid on a satellite image of the location.

Figure 9:
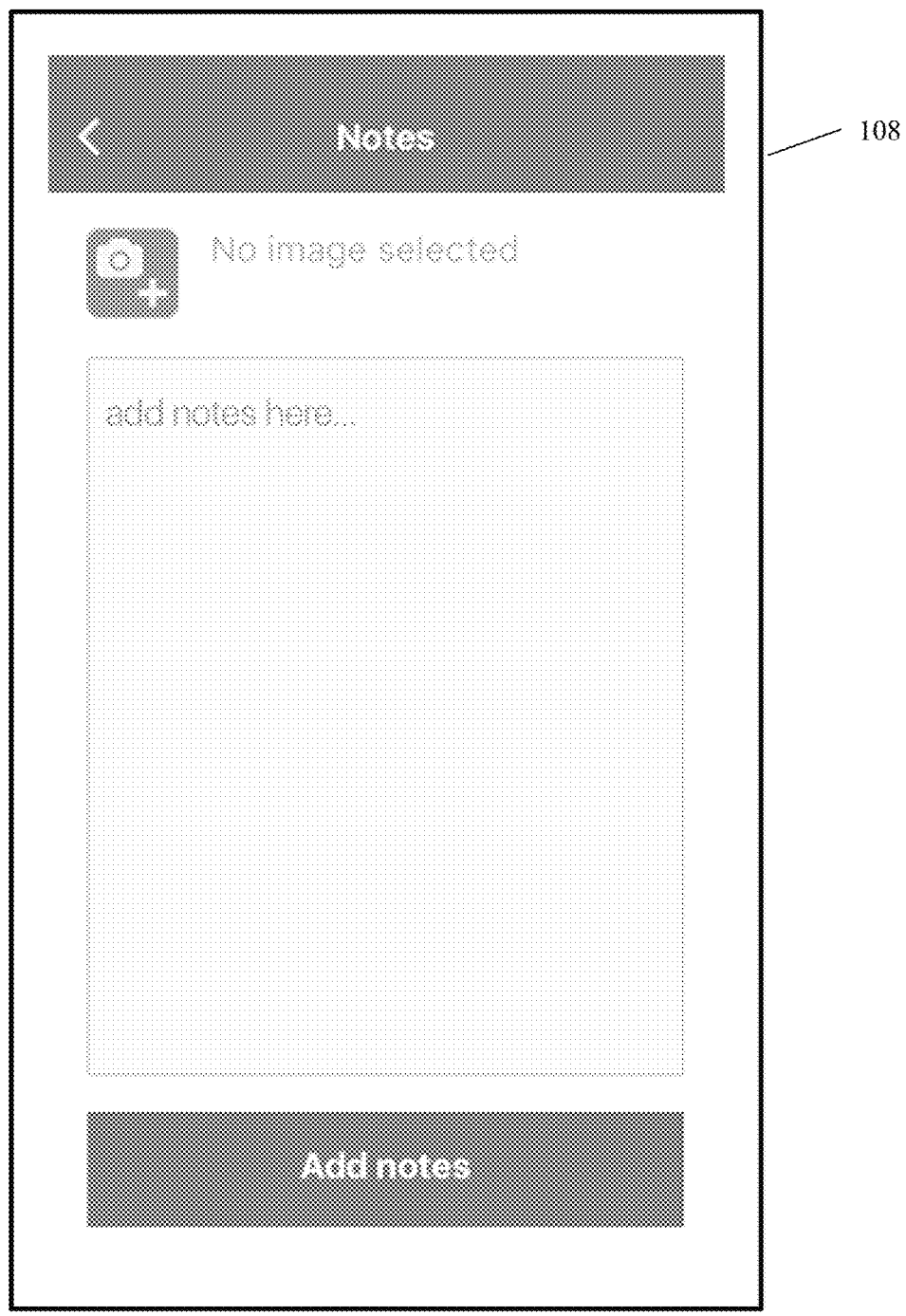
FIGS. 9-10 are simulated notes screen shots of the display of the method of the present invention as shown on a mobile device.
Figure 10:
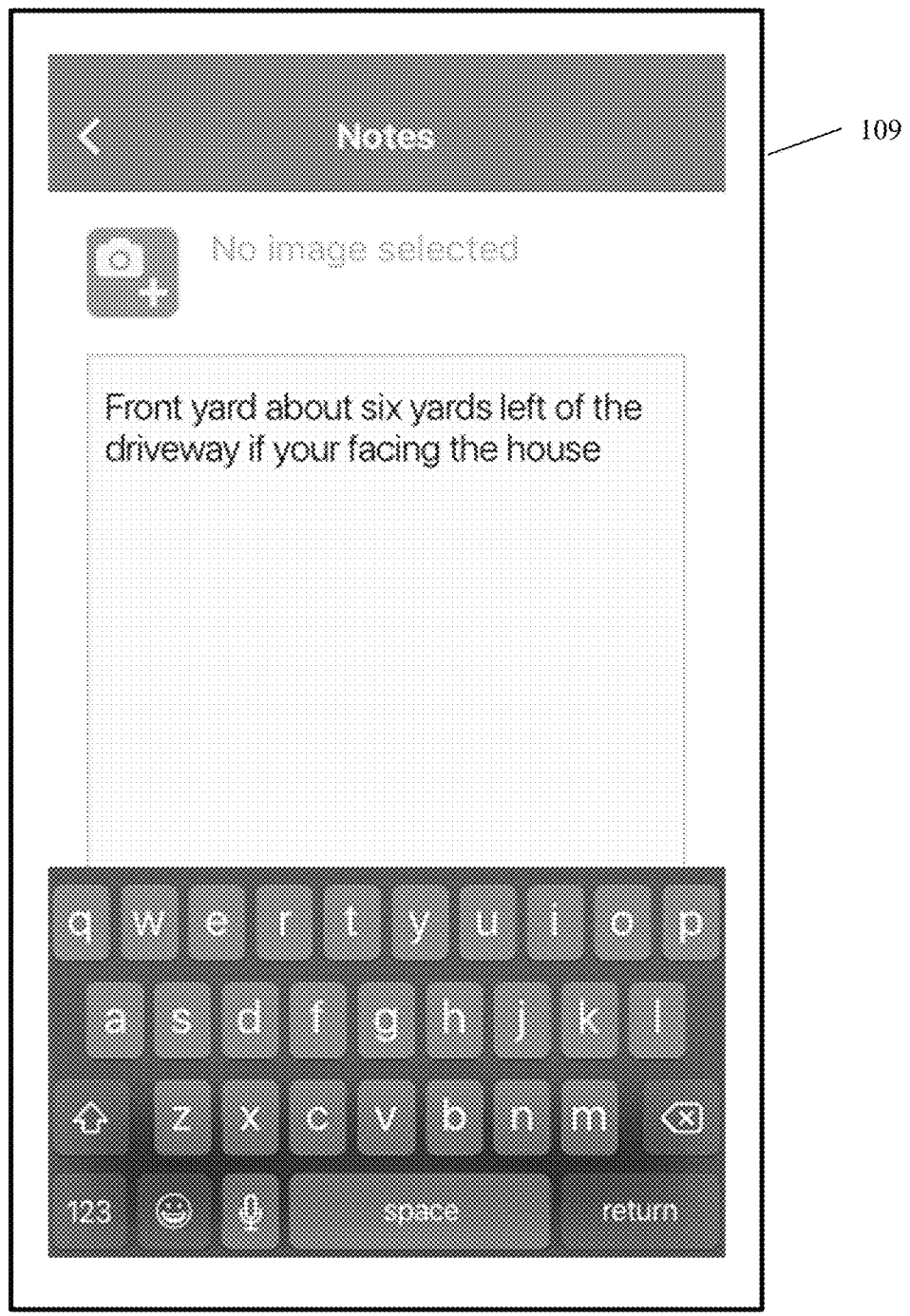

FIGS. 9-10 are simulated notes screen shots 108 and 109 of the display of the method of the present invention as shown on a mobile device. The display shows the entry page for adding marker notes and a simulated note and keyboard entry input device.

Figure 11:
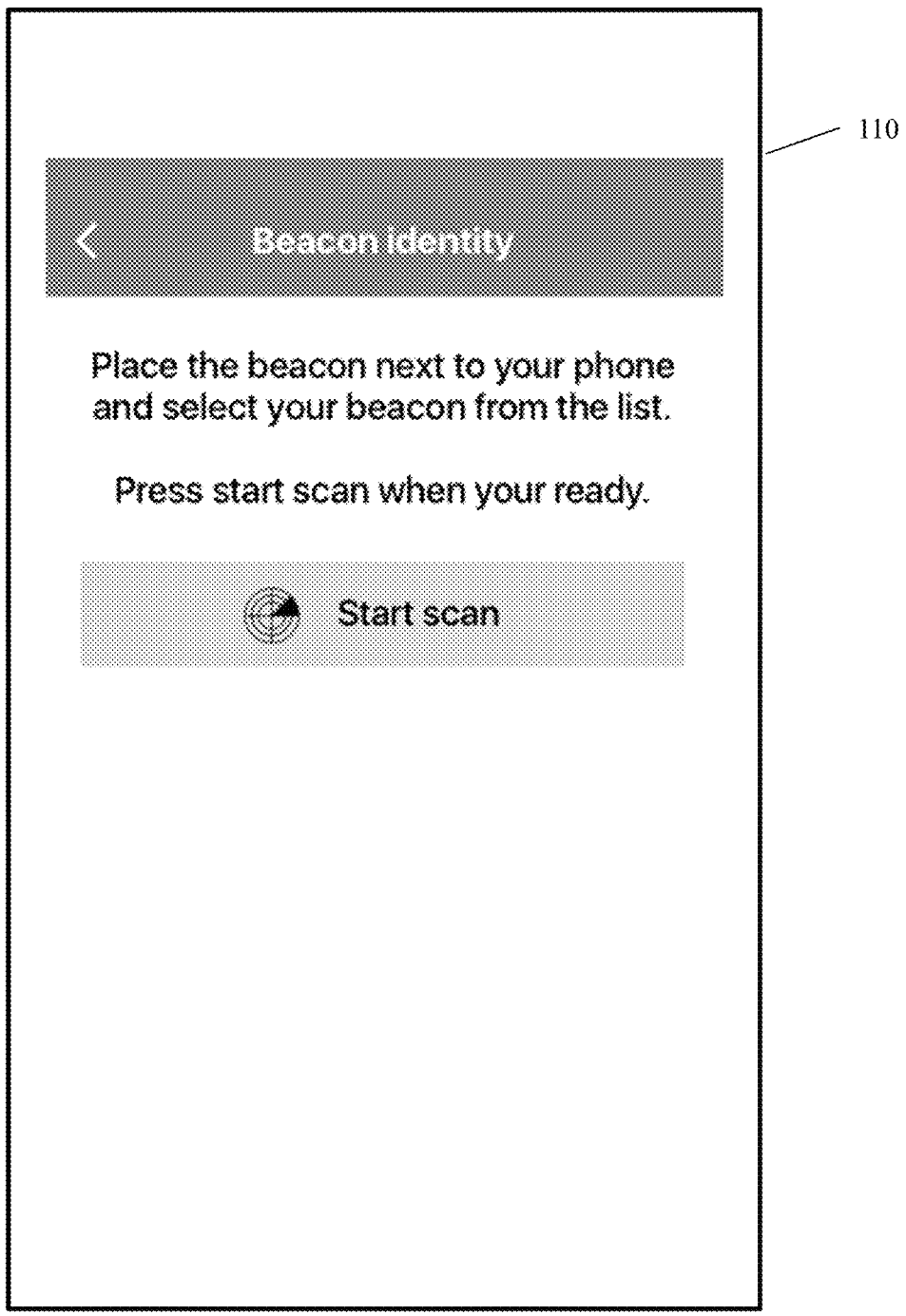
FIGS. 11-12 are simulated beacon identity screen shots of the display of the method of the present invention as shown on a mobile device.
Figure 12:
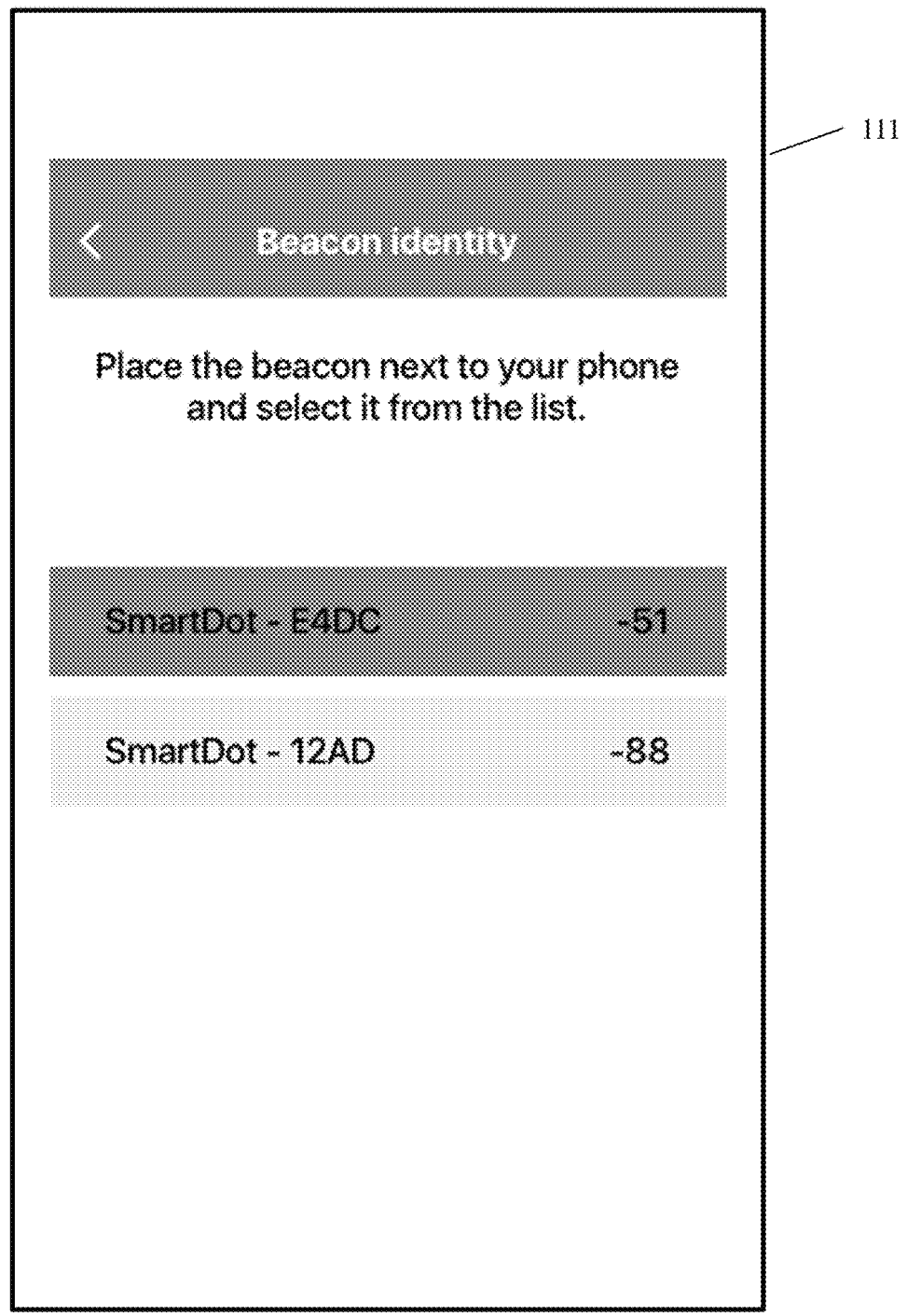
Figure 13:
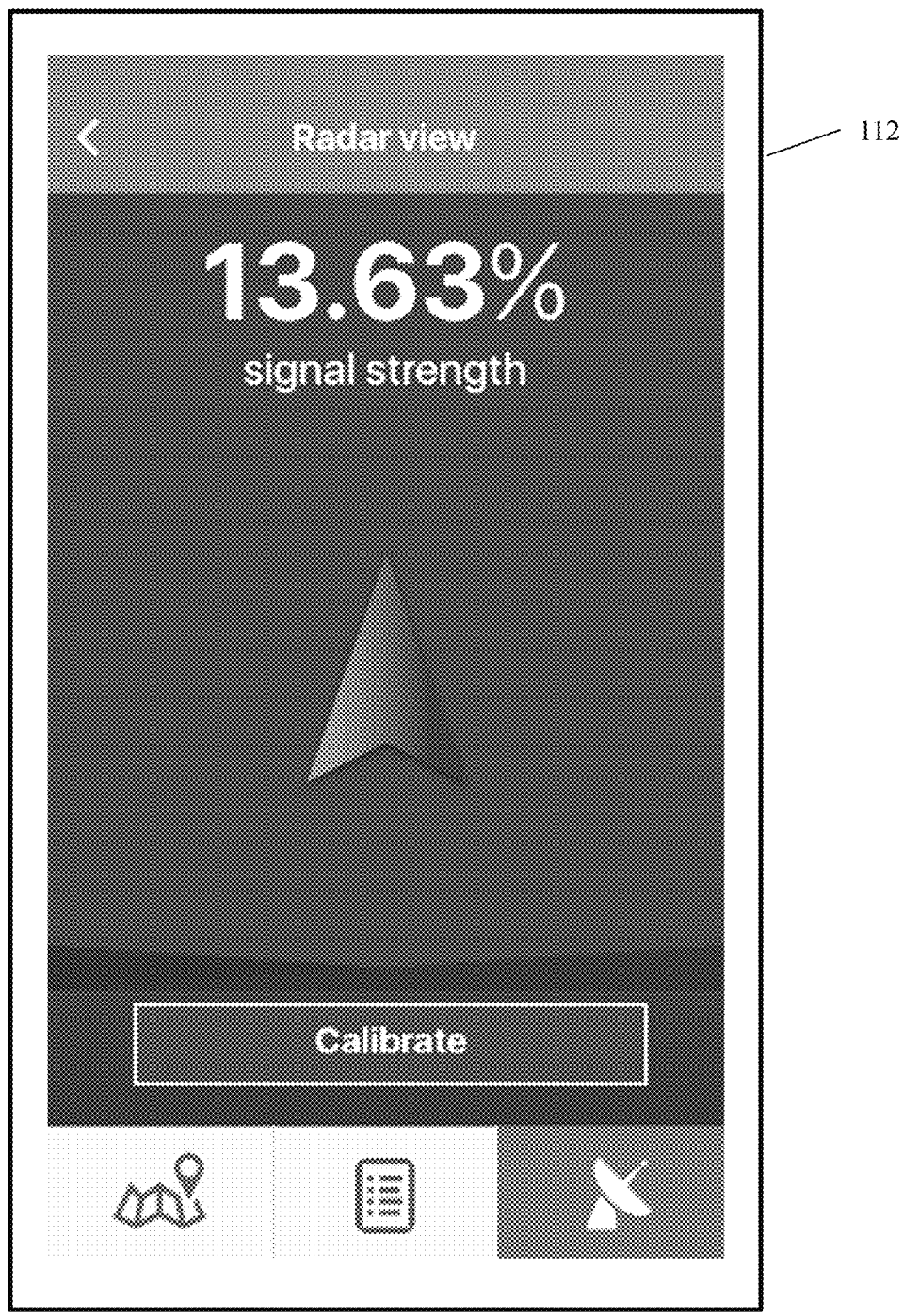
FIGS. 13-16 are simulated radar view signal strength screen shots of the display of the method of the present invention as shown on a mobile device.
Figure 14:
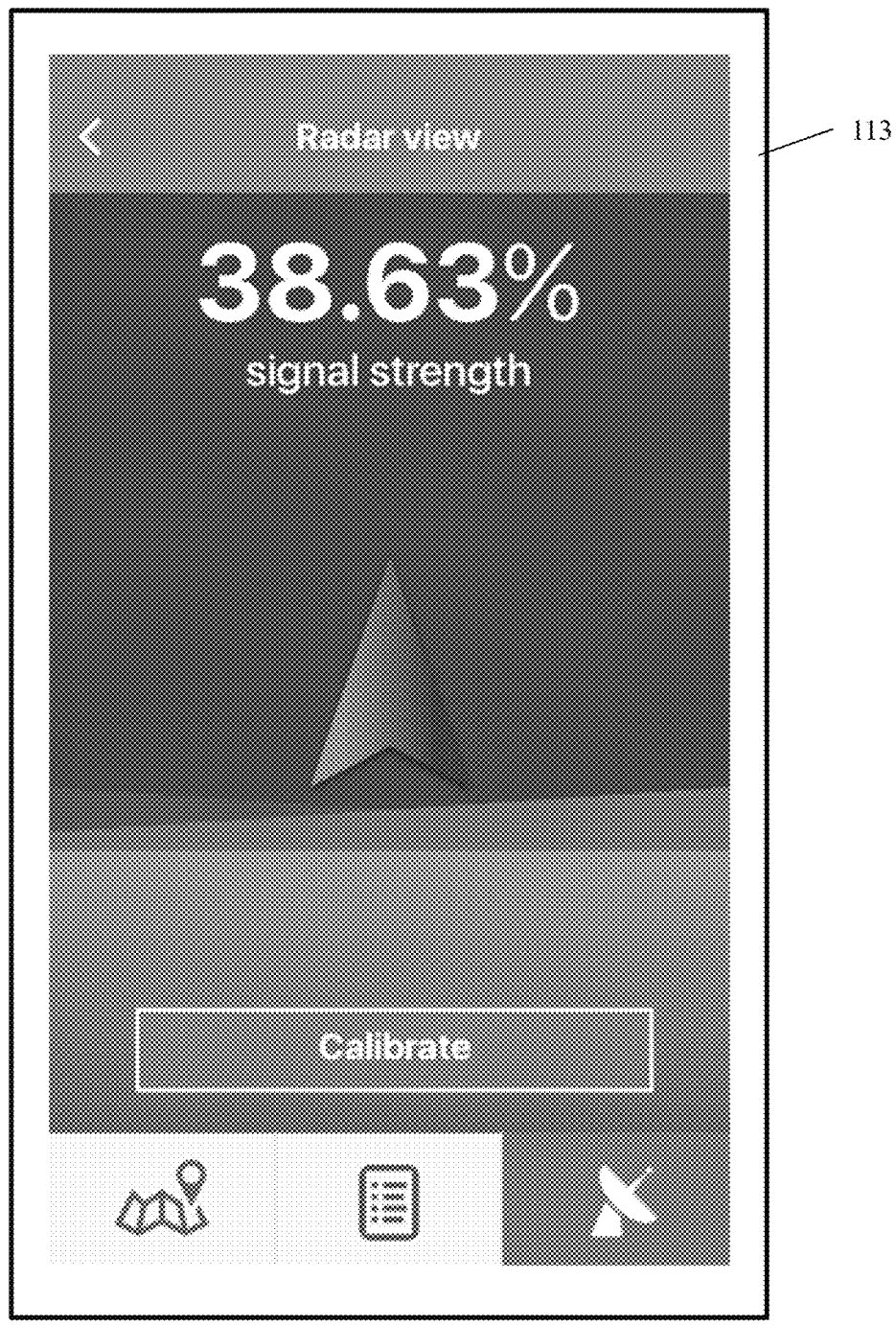
Figure 15:
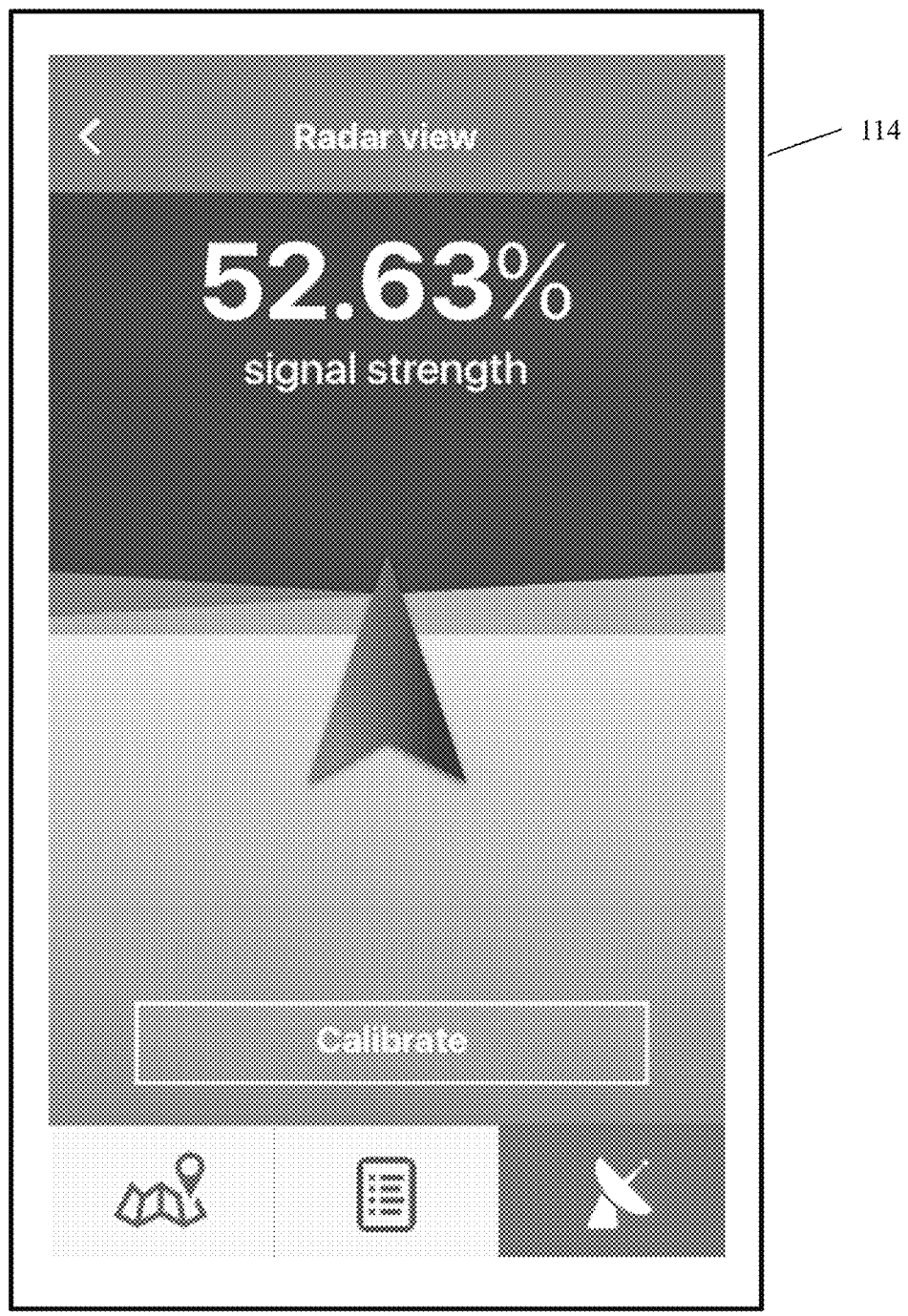
Figure 16:
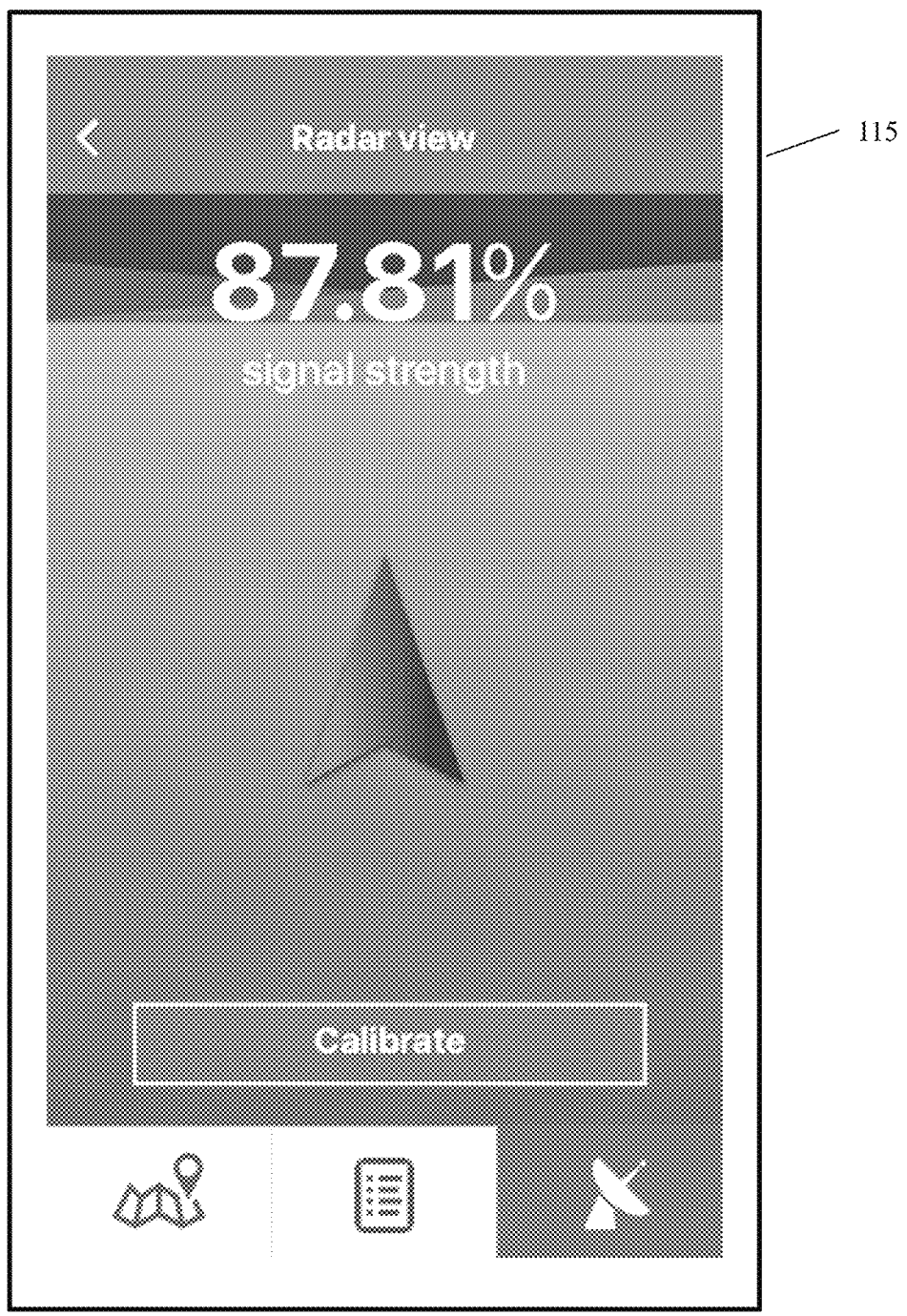

FIGS. 11-12 are simulated beacon identity screen shots 110 and 111 of the display of the method of the present invention as shown on a mobile device. First the display prompts a user to place the beacon next to the smart phone, press a scan button wen ready to start a scan, then select a beacon from a list of beacons detected during the scan period. Beacons are identified by name, ID, and distance information.

FIGS. 13-16 are simulated radar view signal strength screen shots 112, 113, 114, and 115 of the display of the method of the present invention as shown on a mobile device. Based on signal strength, the display changes from red, to orange, to yellow, to green providing a signal strength value and color visual to the user to assist them in locating a beacon and determining if they are close to the beacon or if the direction they are travelling is taking them closer or farther from the beacon.

Figure 17:
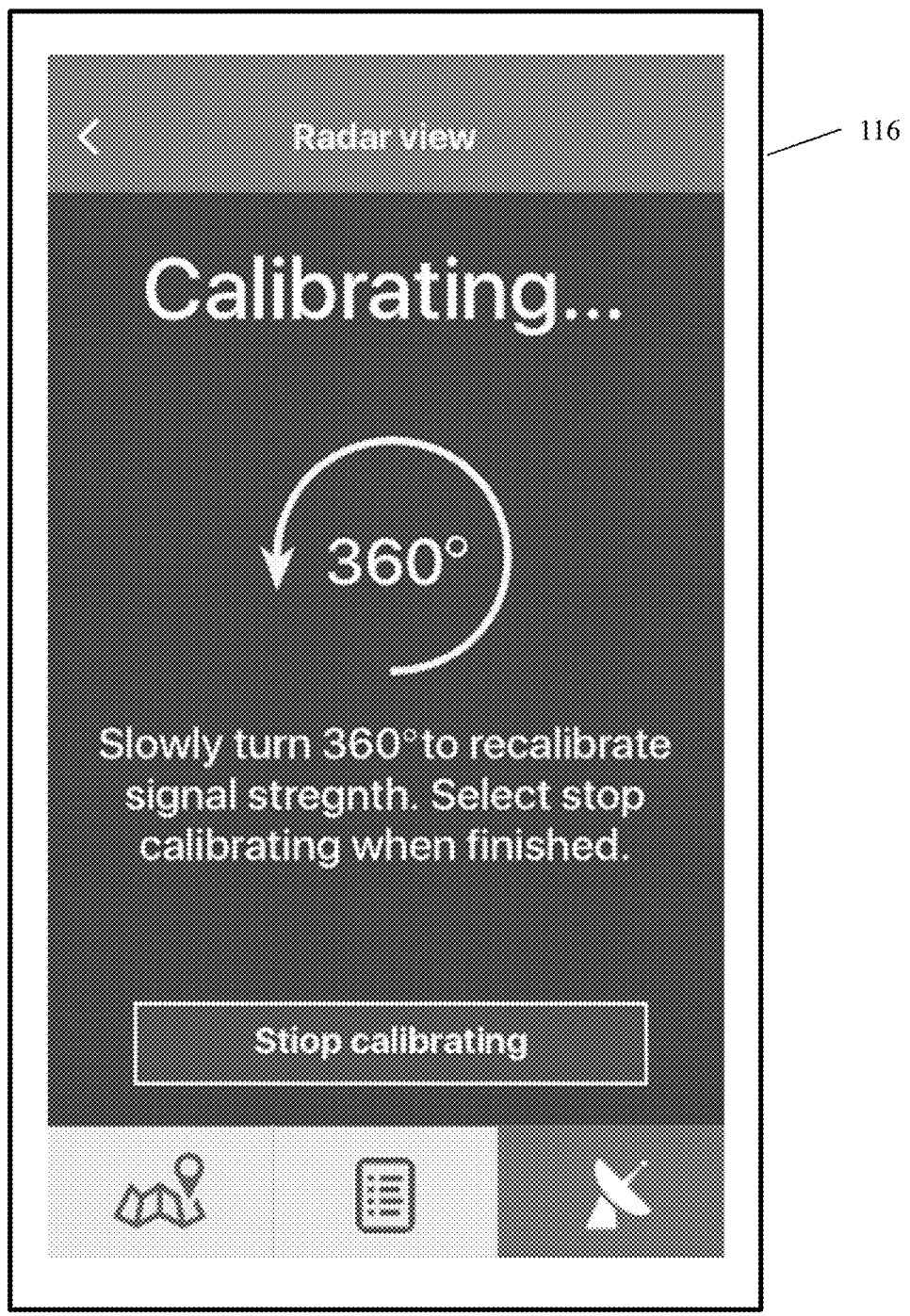
FIG. 17 is a simulated calibration radar view screen shot of the display of the method of the present invention as shown on a mobile device.

FIG. 17 is a simulated calibration radar view screen shot 116 of the display of the method of the present invention as shown on a mobile device. A user calibrates the phone by slowly turning 360 degrees to recalibrate signal strength.

The utility tracker of the present invention has two separate flows. Described below are the placement and location flows as shown in FIGS. 18 and 19.

Figure 18:
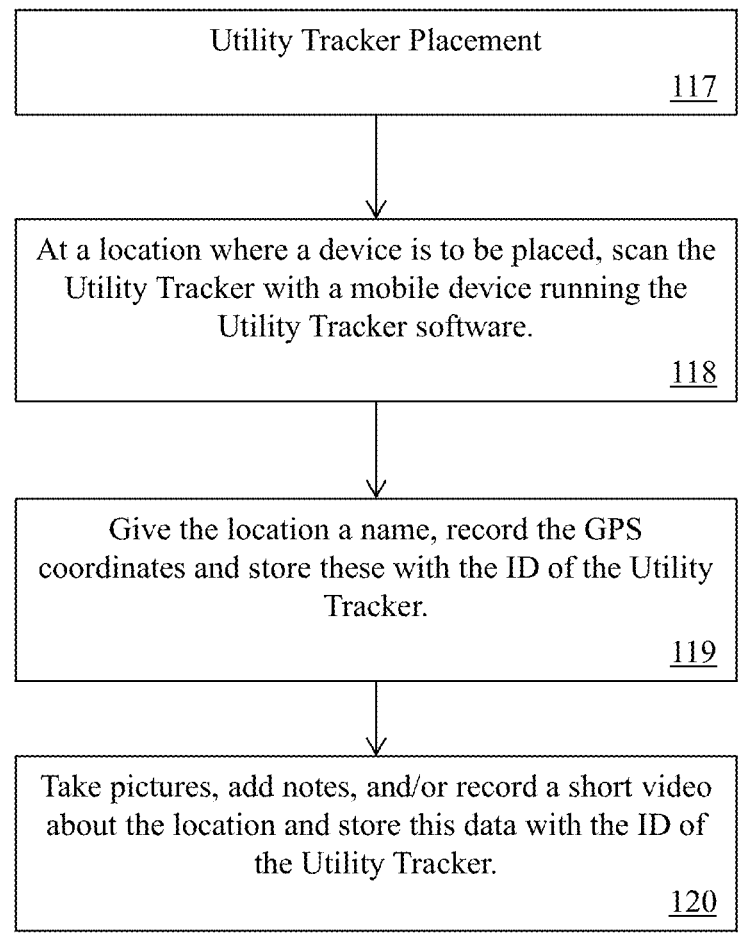
FIG. 18 is a flow chart illustrating the steps of the utility tracker placement method of the present invention.

Now referring to FIG. 18, the utility tracker Placement method 117 of the present invention is illustrated. First, at a location where a device is to be placed, scan the utility tracker with a mobile device running the utility tracker software 118. Next, give the location a name, record the GPS coordinates and store these with the ID of the utility tracker 119. Finally, take pictures, add notes, and/or record a short video about the location and store this data with the ID of the utility tracker 120.

Figure 19:
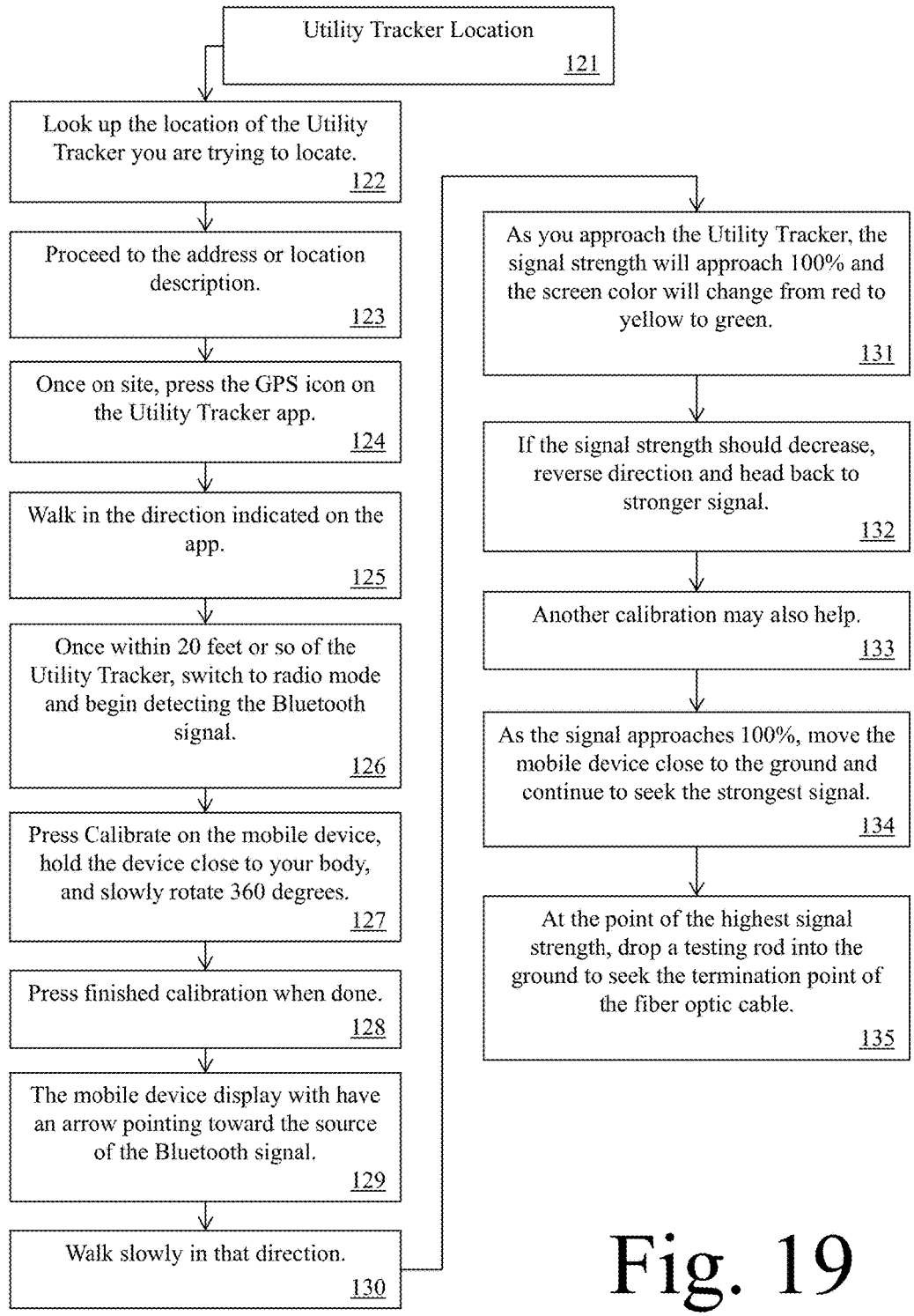
FIG. 19 is a flow chart illustrating the steps of the utility tracker location method of the present invention.

Now referring to FIG. 19, the utility tracker Location method 121 of the present invention is illustrated. First, look up the location of the utility tracker you are trying to locate 122. Proceed to the address or location description 123. Once on site, press the GPS icon on the utility tracker app. 124. Walk in the direction indicated on the app. 125. Once within 20 feet or so of the utility tracker, switch to radio mode and begin detecting the BLUETOOTH signal 126. Next, press Calibrate on the mobile device, hold the device close to your body, and slowly rotate 360 degrees 127. Press finished calibration when done 128. The mobile device display with have an arrow pointing toward the source of the BLUETOOTH signal 129. Walk slowly in that direction 130.

As you approach the utility tracker, the signal strength will approach 100% and the screen color will change from red to yellow to green 131. If the signal strength should decrease, reverse direction and head back to stronger signal 132. Another calibration may also help 133. As the signal approaches 100%, move the mobile device close to the ground and continue to seek the strongest signal 134. At the point of the highest signal strength, drop a testing rod into the ground to seek the termination point of the fiber optic cable 135.

The system is set to run on a computing device or mobile electronic device. A computing device or mobile electronic device on which the present invention can run would be comprised of a CPU, Hard Disk Drive, Keyboard, Monitor, CPU Main Memory and a portion of main memory where the system resides and executes. Any general-purpose computer, smartphone, or other mobile electronic device with an appropriate amount of storage space is suitable for this purpose. Computer and mobile electronic devices like these are well known in the art and are not pertinent to the invention. The system can also be written in a number of different languages and run on a number of different operating systems and platforms.

Although the present invention has been described in considerable detail with reference to certain preferred versions thereof, other versions are possible. Therefore, the point and scope of the appended claims should not be limited to the description of the preferred versions contained herein.

As to a further discussion of the manner of usage and operation of the present invention, the same should be apparent from the above description. Accordingly, no further discussion relating to the manner of usage and operation will be provided.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The embodiments of the invention in which an exclusive property or privilege is claimed are defined as follows:

1. A system and method for locating assets comprising:
   one or more assets;
   a utility tracker attached to each asset;
   each utility tracker containing connectivity and one or more accelerometers; each utility tracker transmitting a signal beacon;
   a mobile device and associated software with information about the utility tracker location, and GPS coordinates;
   a method to approach the utility tracker by GPS until the mobile device is within range of the utility tracker signal;
   a method to calibrate the mobile device to detect a direction of the utility tracker signal; and
   after calibration, a user is directed toward the asset.

2. The method of claim 1 wherein,
   the utility tracker is a low energy tag, plus a three axis accelerometer;
   the utility tracker is secured, by "sticking" a dot to the asset by releasable glue or tape;
   the utility tracker is detected by the mobile device; and
   the mobile device utilizes both GPS and radio signals to pinpoint the location of the utility tracker.

3. The method of claim 1, wherein
   the utility tracker is attached to any asset;
   upon attachment of the utility tracker to the asset, the utility tracker and its low energy beacon are used for tracking the asset's location with the mobile device; and
   during placement of the utility tracker, device ID, GPS coordinates, pictures, and notes are stored for future users to use to locate the utility tracker.

4. The method of claim 1, further comprising the steps of
   selecting the asset to locate;
   being directed to a general area to begin searching for the asset by information stored when the utility tracker was first placed, including GPS coordinates, pictures, drawings, and notes; utilizing the mobile device and GPS to approach a radio signal of the utility tracker;
   once in range of the beacon, the mobile device detects the signal from the utility tracker;
   at this point the signal direction is not easy to detect, so a unique calibration method has been developed which utilizes a user's body as a shield;
   the mobile device is then able to detect direction, and the software would direct the user toward that signal; and
   as the user approaches an origin of the signal, the software would display a greater signal strength.

5. The method of claim 4, wherein if the user should happen to go past the utility tracker, the signal strength would decrease.

6. The method of claim 4, further comprising the steps for calibration of
   holding the mobile device close to the user's body;
   selecting to calibrate on the mobile device, the user slowly turns 360 degrees; the mobile device is then able to detect direction, and the software would direct the user toward that signal;
   as the user approaches the origin of the signal, the software would display the greater signal strength, and if the user should happen to go past the utility tracker, the signal strength would decrease.

7. The method of claim 1, further comprising the steps of utility tracker placement
   at a location where the asset is to be placed, scan the utility tracker with the mobile device running the utility tracker software;
   give the location a name, record the GPS coordinates and store these with an ID of the utility tracker; and
   take pictures, add notes, and record a short video about the location and store this data with the ID of the utility tracker.

8. The method of claim 1, further comprising the steps of utility tracker location
   looking up the location of the utility tracker you are trying to locate;
   proceed to an address or location description;
   pressing a GPS icon on a utility tracker app.;
   walking in the direction indicated on the app.;
   once within 20 feet of the utility tracker, switch to radio mode and begin detecting the signal.

9. The method of claim 8, further comprising the steps of calibration
   pressing calibrate on the mobile device, hold the device close to your body, and slowly rotate 360 degrees;
   pressing finished calibration when done;
   the mobile device display with have an arrow pointing toward a source of the signal; and
   start walking slowly in that direction.

10. The method of claim 8, wherein
- approaching the utility tracker, a signal strength will approach 100% and a screen color will change from red to yellow to green;
- if the signal strength should decrease, reverse direction and head back to stronger signal; and
- as the signal approaches 100%, move the mobile device close to ground and continue to seek a strongest signal.

11. The method of claim 10, wherein another calibration is performed.

* * * * *